United States Patent [19]
Wagner

[11] 3,974,342
[45] Aug. 10, 1976

[54] SWITCHING ARRANGEMENT FOR TELECOMMUNICATIONS SYSTEMS

[75] Inventor: Karl Wagner, Munich, Germany

[73] Assignee: Siemens Aktiengesellschaft, Berlin & Munich, Germany

[22] Filed: Sept. 25, 1974

[21] Appl. No.: 509,061

[30] Foreign Application Priority Data
Sept. 27, 1973 Germany............................ 2348620

[52] U.S. Cl............................................ 179/18 FH
[51] Int. Cl.² ....................................... H04Q 3/24
[58] Field of Search............... 179/18 FH, 175.2 C, 179/27 DB, 27 E; 307/242, 246; 328/97

[56] References Cited
UNITED STATES PATENTS

| | | | |
|---|---|---|---|
| 3,231,680 | 1/1966 | Yamato et al................... | 179/18 FH |
| 3,508,010 | 4/1970 | Schuberth....................... | 179/18 FH |
| 3,813,500 | 5/1974 | Roberts.......................... | 179/175.2 C |

*Primary Examiner*—Thomas A. Robinson

[57] ABSTRACT

A circuit arrangement for identifying one of two or more subscriber sets connected to a common trunk over branch circuits is described. A parallel arrangement of a capacitor and a threshold diode is inserted in at least some of the branch circuits. An electronic switch is connected across the latter parallel circuit, and it can be switched to a conducting state at the voltage level normally applied to the common trunk. Prior to the electronic switch reaching its conducting state, a voltage builds up on the capacitor, the value of which voltage is dependent of the breakdown level of the diode. This voltage on the capacitor identifies the subscriber set associated therewith.

2 Claims, 2 Drawing Figures

SWITCHING ARRANGEMENT FOR TELECOMMUNICATIONS SYSTEMS

BACKGROUND OF THE INVENTION

This invention relates to a switching arrangement for telecommunications systems, more particularly telephone systems, for identifying one of two or more subscriber sets connected over individual branch circuits to a common trunk leading to an exchange.

Arrangements such as that described above are commonly called party lines and are employed generally with a view to economizing on subscriber lines in thinly populated areas. The subscribers have the possibility of cutting into calls in progress to initiate emergency calls or conduct internal conversations. Due to the introduction of automatic long-distance traffic, there exists a demand for individual call data recording and, thereby, the necessity for clearly identifying the connected subscribers. A commonly used technique for solving this problem is to identify the individual subscriber sets through individual identification frequencies and to provide them with means for transmitting and/or receiving these frequencies.

Other prior art arrangements employ the current-direction dependency of electrical rectifiers for the identification of the subscriber sets. By using a ground wire, up to four subscriber sets can be distinguished from one another. However, the use of ground wires in the subscriber sets results in a great many disadvantages.

In another prior art arrangement there are looped into the individual branch circuits non-linear circuit elements which have operating points having a low differential resistance for both current directions. These operating points, however, cannot be attained for one current direction until a threshold voltage has been exceeded. One disadvantage of such circuit elements which, e.g., may be realized by means of four-layer diodes, is that special firing or triggering processes must be performed.

Furthermore, at first only two groups of subscriber sets must be distinguished immediately, the full identification being performed in accordance with the staggered values of the threshold voltages of the inserted circuit elements by gradually increasing the direct voltage for identification. Moreover, without special provision one cannot intrude in a call in progress, because in such a connection the voltage between the wires of a common trunk decreases to such a level that a second four-layer diode can no longer be fired.

In still another prior art arrangement, the non-linear circuit elements looped into the individual subscriber branch circuits exhibit such a currentdirection-dependent threshold behavior that their differential resistance is positive at all times and possesses a comparatively high value below the threshold voltage and a relatively low value thereabove. The threshold voltage of the circuit elements, which may be realized through parallel connection of rectifiers having opposite polarities or by connecting in series Zener diodes having opposite polarities, must be graded in descending sequence relative to the circuit elements following one another according to their ordinal numbers.

In this case, various partial voltages must be made available for purposes of identification, which have a well-defined voltage value relative to the individual threshold voltages of the circuit elements. The subscriber set to be identified is ascertained through stepwise application of the voltages.

It is, therefore, an object of the invention to provide apparatus which simplifies the aforementioned identification process in the exchange and which minimizes the influence of parasitic voltages, while keeping low the number of individual subscriber sets.

A further object of the invention is to provide such apparatus which will permit the individual subscribers to continue to have the possibility of intervening in a call in progress.

SUMMARY OF THE INVENTION

In accordance with the invention, the foregoing and other objects are achieved in that the parallel connection of a capacitor and of a threshold diode is inserted in all or in some of the branch circuits allocated to individual subscribers. This parallel connection is bridged by an electronic switch that can directly be switched to the conducting state at the voltage applied to the common trunk during the normal feeding state. During the feeding effected for purposes of identification and initially not affecting the circuit condition of the electronic switch the voltage appearing at the capacitor is characteristic of the relevant subscriber set.

The additional circuit inserted into a branch circuit has a low resistance as a result of the closed loop caused by the removal of the handset, by means of the electronic switch, which in the process is switched directly to the conducting state and which, for example, may be constituted by a thyristor or an appropriate transistor circuit. Each subscriber has the possibility of cutting into a call in progress, since the allocated subscriber additional circuit is, likewise, directly driven with the loop current. The identification device can be designed very simply whereby it is solely assumed that during the power supply the subscriber additional circuit cannot be driven. To achieve this purpose, a constant current lying below the operating threshold of the electronic switch may, for example, be fed into the common trunk, or a voltage source supplying a rising voltage may be switched into circuit. The voltage being built up at the capacitor of the relevant subscriber additional circuit and limited by the breakdown voltage of the relevant Zener diode identifies the subscriber set concerned. Thus, by simply measuring the voltage on a wire of the common trunk, a subscriber can be identified. By selecting an appropriately high identification voltage, the risk of false identification resulting from coupled-in parasitic voltages is greatly reduced. The use of a ground wire in the subscriber sets also becomes unnecessary.

If more than two subscribers are connected to the common trunk, then the individual threshold diodes differ in their respective breakdown voltages for the unambigious identification through appropriately graded values.

BRIEF DESCRIPTION OF THE DRAWINGS

The principles of the invention will be more readily understood by reference to a description of preferred embodiments given below in conjunction with the drawings which are briefly described as follows.

DETAILED DESCRIPTION OF THE DRAWINGS

Figure 1:
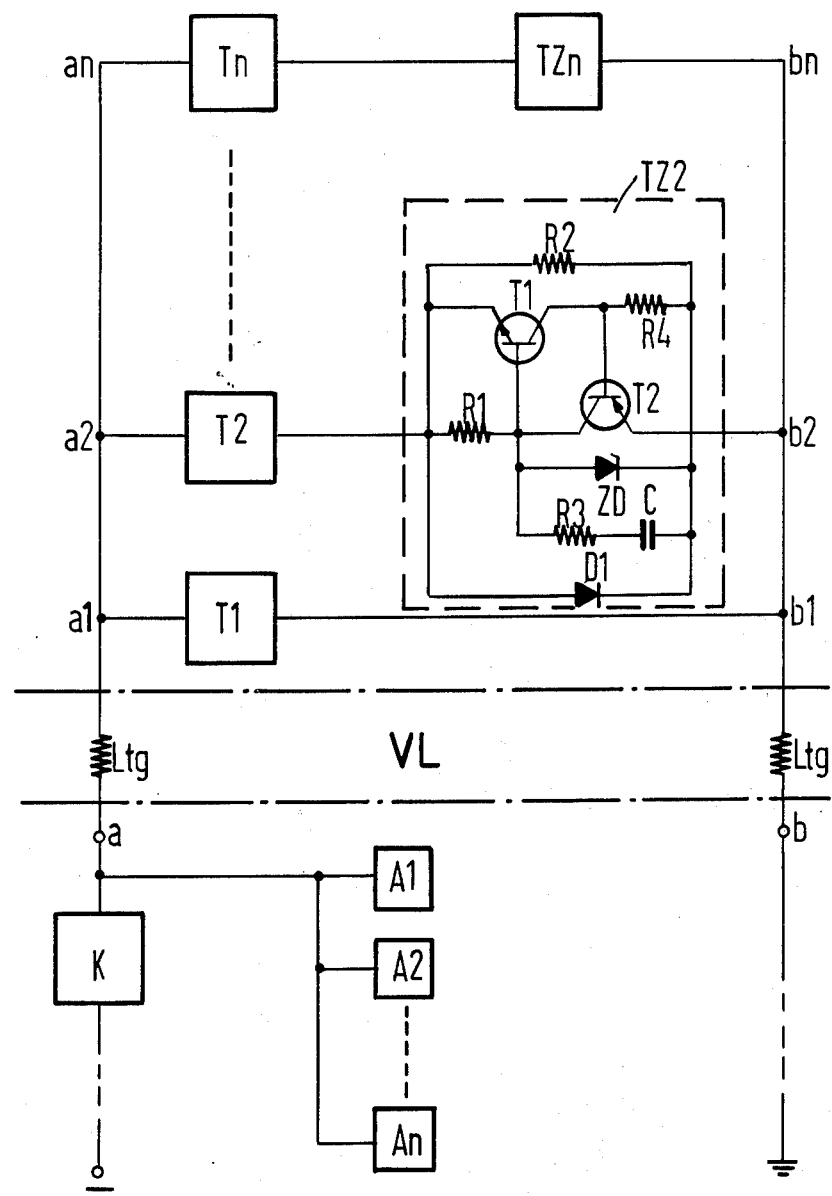
FIG. 1 is a schematic diagram of a basic circuit arrangement for the identification of a plurality of subscriber sets according to the invention.

In FIG. 1 the subscriber sets T1 and Tn are connected over the branch circuits a1, b1, to an, bn allocated, respectively, to individual subscribers to the common trunk VL and comprising the two line wires $a$ and $b$. While the subscriber set labeled T1 is connected directly to the common trunk, subscriber additional circuits are switched into the branch circuits of the other subscriber sets. The circuitry constituting such a subscriber additional circuit is illustrated for subscriber set T2.

Each subscriber additional circuit contains the parallel connection of a capacitor C and a Zener diode ZD, the parallel connection being bridged by an electronic switch, which may be constituted by a thyristor or a transistor circuit having a similar mode of operation, as shown in FIG. 1.

As a result of a closed loop caused by the removal of the handset, the transistor is opened by the charging current of the capacitor flowing through the capacitor C and the resistors R3 and R1, as well as the base-to-emitter junction of transistor T1. As a result of this current flow, transistor T2 likewise attains the conducting state, and this circuit condition is maintained. Thus, the subscriber additional circuit booster has switched to a low-resistance state and, in addition to a slight direct-current voltage drop, it causes a negligible small damping for voice currents.

If the subscriber additional circuit booster should not be switched to a low-resistance state by the charging current of the capacitor, then the Zener diode ZD, after attaining the Zener voltage, breaks down to the T-wire, and the transistor T1 is opened by the Zener current.

In order to identify the calling subscriber set, the supply voltage applied to the T-wire and the R-wire is switched off briefly and replaced by a source K supplying a constant current. The line capacitances and the capacitor C of the subscriber additional circuit allocated to the calling subscriber set is charged through the constant-current feeding. The magnitude of the constant current supplied shall lie below the current threshold at which the transistor T1 is opened. This may, for example, apply in the case of a current strength below 1 mA.

The voltage between the T-wire and the R-wire rises with a time delay. The calling subscriber set can now be ascertained by measuring the voltage amplitude in the trunk VL. The voltage at the capacitor contained in the subscriber additional circiut can attain a maximum value corresponding to the breakdown voltage of the parallel Zener diode.

In the case of more than two subscriber sets, different threshold voltages are allocated to the threshold diodes contained in the individual subscriber additional circuits. From the magnitude of the voltage building up upon identification of the subscriber line and ascertained by the interpreter circuit A1 to An, the subscriber set whose handset is removed, can then be identified by switching elements switched into operation over the interpreter circuits. If graded threshold voltages are provided in ascending sequence for the individual threshold diodes, then upon identification of a subscriber set whose handset has been removed, the interpreter circuits connected in series in their ordinal number are likewise energized in addition to the interpreter circuit allocated to said subscriber set. Through appropriate wiring of the switching elements switched into operation by the interpreter circuits, the talking subscriber can be identified in a simple way, e.g., over appropriately controlled contacts.

By means of the diode D in the subscriber additional circuit, the possibility of calling is maintained in case of change of polarity of the wires. The charge on the capacitor C can be built up over the high-impedance resistor R2. It is possible to intervene in a call in progress for emergency calls or for internal traffic, since by removing the handset, the allocated subscriber additional circuit is switched to the low-resistance state in the manner described hereinabove.

Figure 2:
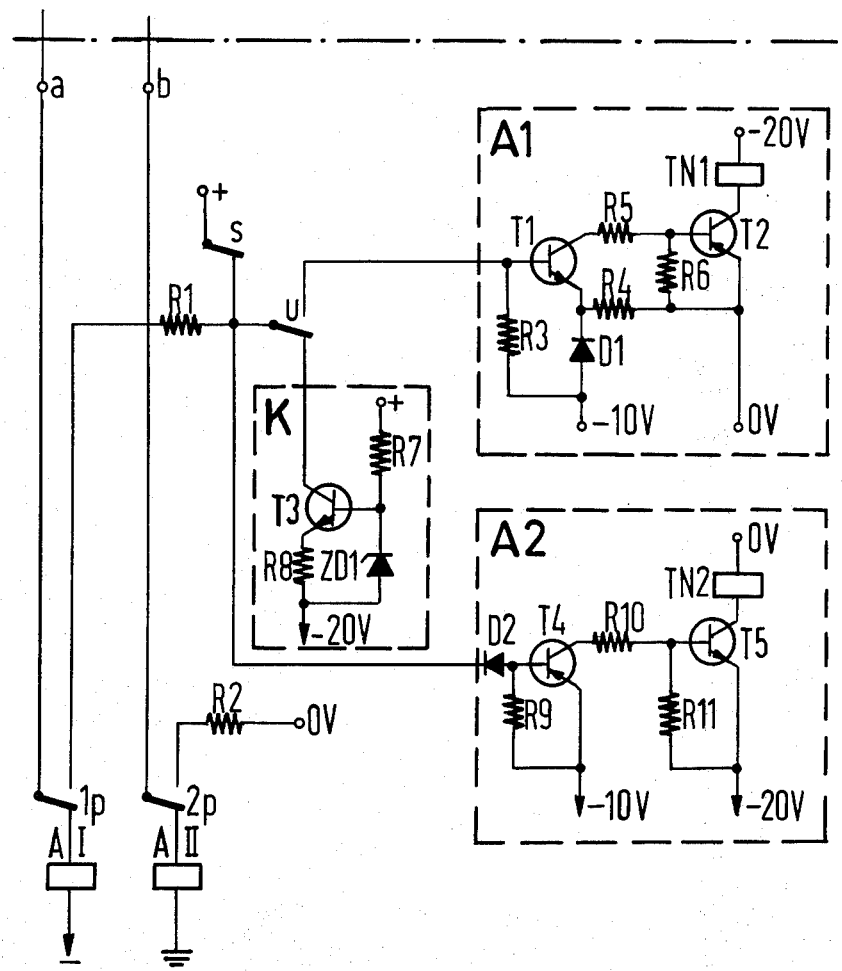
FIG. 2 illustrates the arrangement for the identification of two subscribers connected to a common trunk.

By means of the switching arrangement shown in FIG. 2, one is enabled to identify two subscriber sets corresponding, say, to the subscriber sets T1 and T2 of FIG. 1 and connected to a common trunk. In order to see which of the two subscribers has removed the handset, first the T-wire and R-wire are discharged over the resistors R1 and R2 for purposes of identification by operating the contacts 1p and 2p. After subsequent opening of the contact s, a constant current is fed into the T-wire over the resistors R8, R1 and R2 by means of the transistor T3. The current has a value which is selected so that the subscriber additional circuit allocated to the subscriber set T2 cannot go over to the low-resistance state. Assuming that the handset of the subscriber set T2 has been lifted, the line capacitance and the capacitor C in the allocated subscriber additional circuit are charged through the constant-current feeding, thereby increasing the voltage on the T-wire. The interpreter circuit A2 made up of the transistors T4 and T5 must be designed such that it comes into action when a voltage of, e.g., 10 Volts is attained. This happens, because when this voltage is attained, the transistor T4 shall be switched through, causing the transistor T5 to be opened also. As a result, the relay TN2 picks up and the subscriber set T2 is properly identified.

If the handset of the subscriber set T2 has been removed, then, since the subscriber has no subscriber additional circuit, the voltage being developed on the line during the constant current feeding cannot reach the value at which the transistor T4 is opened as a requisite condition. During the feeding of a current which, e.g., is less than 1 mA, a voltage of less than 5 Volts would be developed on the T-wire in the case of a maximum loop resistance of, e.g., 5 kilohms. In order to perform the identification process, the contact u is now operated after a predetermined time tuned to the maximum identification time required for the subscriber set T2. At the voltage being developed on the T-wire as a requisite condition, the transistor T1 will now be switched to the conducting state. As a result, the transistor T2 triggered over it likewise attains the conducting state, so that the relay TN1 picks up and the subscriber set T1 is properly identified. The transistors T1 and T2 could also be replaced by a thyristor.

The preferred embodiments described hereinabove are intended only to be exemplary of the principles of the invention. It is comtemplated that the described embodiments and their described operating parameters can be modified or changed while remaining within the scope of the invention as defined by the appended claims.

I claim:

1. Apparatus in a telecommunication network for identifying one of a plurality of subscriber sets connected to a common trunk by means of individual branch circuits, comprising:
  a parallel combination of a capacitor and a threshold switching means, operable at a predetermined voltage level inserted in at least some of said branch circuits,
  electronic switch means connected across each said parallel combination and operable to provide a shunt thereacross when the normal voltage feed is applied to said common trunk,
  the voltage appearing across each said capacitor prior to operation of said electronic switch being indicative of the identity of the said subscriber set associated therewith.

2. The apparatus defined in claim 1 wherein each said threshold switching means differs from the others by their operating voltages.

* * * * *